United States Patent [19]

Dwyer

[11] 4,243,271
[45] Jan. 6, 1981

[54] HYDRAULIC BRAKING SYSTEM

[75] Inventor: Robert M. Dwyer, Livonia, Mich.

[73] Assignee: Massey-Ferguson Inc., Detroit, Mich.

[21] Appl. No.: 44,785

[22] Filed: May 31, 1979

[51] Int. Cl.³ .......................... B60T 8/26; B60T 11/32
[52] U.S. Cl. ..................................... 303/7; 303/6 C; 303/84 R
[58] Field of Search ............... 188/349; 303/6 R, 6 C, 303/7, 9, 84 A, 84 R

[56] References Cited

U.S. PATENT DOCUMENTS

| | | | |
|---|---|---|---|
| 3,718,373 | 2/1973 | Höfer | 303/7 |
| 4,017,125 | 4/1977 | Durling | 303/7 |
| 4,030,757 | 6/1977 | Durling | 303/7 X |
| 4,076,323 | 2/1978 | Kroth | 303/6 R |

Primary Examiner—Duane A. Reger
Attorney, Agent, or Firm—John C. Thompson

[57] ABSTRACT

A braking system for a towing vehicle having a trailer brake valve (24) and hydraulically operated brakes (12) and a trailer having hydraulically operated brakes (14). A novel pilot operated control valve (34) directs the output of the trailer brake valve (24) to both the vehicle brakes (12) and the trailer brakes (14). If the line (46) to the trailer brakes (14) should burst, flow to the trailer brakes is substantially throttled off due to the valve spool (62) shifting to substantially block the flow of fluid through port (40) thereby permitting continued operation of the vehicle brakes. The operating pressure ranges of the brakes may be different. Thus, the operating pressure range of the vehicle brakes (12) is the same as pilot line (74) pressure, which is the output pressure of the brake master cylinder (16), while the operating pressure range of the trailer brakes (14) is the same as output pressure of the trailer brake valve (24) in line (44). The trailer brake valve (24) may have an output proportionately different than pilot line pressure (30).

17 Claims, 4 Drawing Figures

4,243,271

HYDRAULIC BRAKING SYSTEM

TECHNICAL FIELD

The present invention relates generally to a hydraulic braking system for use with a towing vehicle and a trailer both of which are provided with hydraulic brakes, and more particularly to a braking system for a vehicle provided with a brake master cylinder and a trailer whose hydraulic brakes are actuated by a pilot operated trailer brake valve mounted on the towing vehicle.

BACKGROUND

It is known to provide a towing vehicle and a trailer with hydraulically actuated brakes, which brakes are operated over differing pressure ranges. The towing vehicle, which may be a farm tractor, can be provided with hydraulically operated brakes which are operated by a brake master cylinder over a relatively low pressure range. The trailer can be provided with hydraulic brakes operated over a substantially higher range. Due to the differences of pressures which may be required for actuating the brakes of the towing vehicle and the trailer, it is not practical to connect the brake line for the trailer directly into the brake line system for the vehicle. As most farm vehicles are provided with auxiliary hydraulics including a pump capable of delivering fluid under pressure at least equal to the requirements for the operation of trailer brakes, it is customary to provide a pilot operated trailer brake valve. This valve is interconnected with the pump and, when operated by pilot line pressure from the brake master cylinder, is capable of delivering fluid to the trailer brakes within a second pressure range substantially greater than the pressure range for actuating the vehicle brakes. An example of a prior art trailer brake valve is illustrated in U.S. Pat. No. 3,718,373 issued Feb. 27, 1973.

In the prior art designs the fluid delivered by the trailer brake valve has been used exclusively for the trailer and has not been available for the towing vehicle. In part this has been due to requirements that the braking of the towing vehicle should not be effected if the brake line to the trailer should break. However, if the output from the trailer brake valve could be utilized for the vehicle brakes the braking effort on the part of the vehicle operator could be substantially reduced.

OBJECTS AND SUMMARY OF THE INVENTION

It is an object of the present invention to provide control means which can be utilized with a pilot operated trailer brake valve to permit the trailer brake valve to operate the vehicle brakes in addition to the trailer brakes.

More particularly, it is an object of this invention to provide a novel pilot operated control valve interconnecting the output of a trailer brake valve with hydraulically operated vehicle brakes and trailer brakes, and which, when operated, will cause the vehicle rear brakes to be hydraulically operated within a first pressure range and the trailer brakes to be hydraulically operated within a second greater pressure range.

It is a further object of the present invention to provide a control system which is capable of receiving the output of a trailer brake valve, during normal operation dividing the flow of hydraulic fluid to vehicle brakes and trailer brakes, and, in the event that the line to the trailer brakes should break, diverting virtually all of the flow to the vehicle brakes while maintaining the desired operating pressure of the vehicle brakes.

The above is achieved by interposing a novel pilot operated control valve in the hydraulic line which extends from the output port of a trailer brake valve to the trailer brakes. The pilot operated control valve is provided with a valve body having an inlet port, first and second output ports connectable to the trailer brakes and the vehicle brakes, respectively, and a third port connectable to reservoir. A valve member within the valve body is normally spring biased to a first position where the inlet port is in communication with the first outlet port, and the second outlet port is in communication with the third outlet port. When the pilot line is pressurized, as for example by applying the brake master cylinder, the valve member will customarily be shifted to a second position where the inlet port is in communication with the first outlet port and in restricted communication with the second outlet port causing the vehicle brakes to be operated at a lower pressure range than the trailer brakes. When the valve member is in this second position flow to the third port is blocked. In the event that the line to the trailer brakes should break, the valve member is shifted to a third position where flow to the broken line is restricted. As there will be a controlled pressure drop, the vehicle brakes will continue to operate at their desired pressure range. In the meantime, flow to the third outlet is still blocked.

Additional objects and advantages of this invention will become more apparent to those skilled in the art after a consideration of the following detailed description taken in conjunction with the accompanying drawings in which a preferred form of this invention is illustrated.

DETAILED DESCRIPTION

Figure 1:
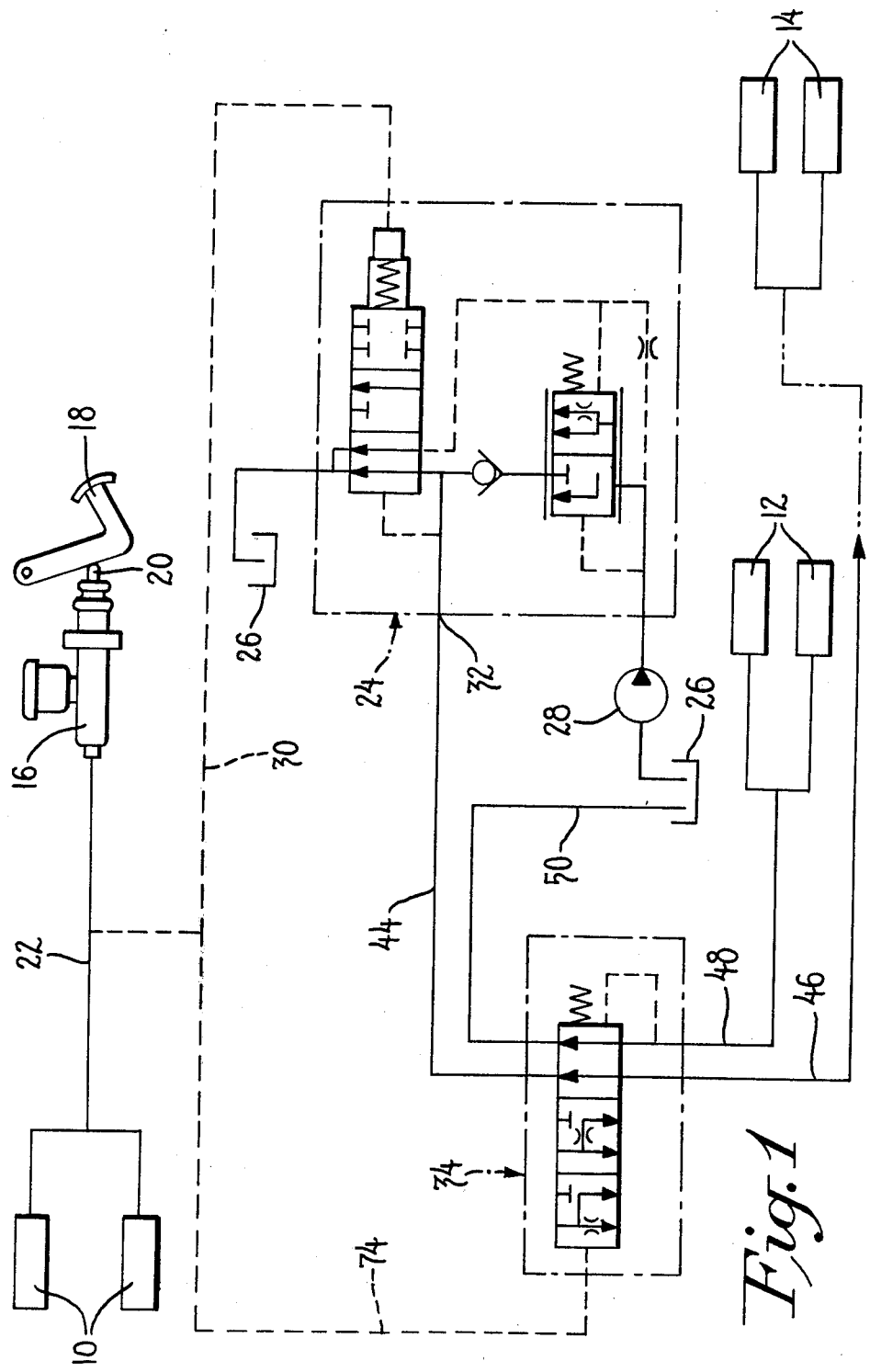
FIG. 1 is a hydraulic circuit diagram of a braking system in which the principles of the present invention are incorporated.
Figure 2:
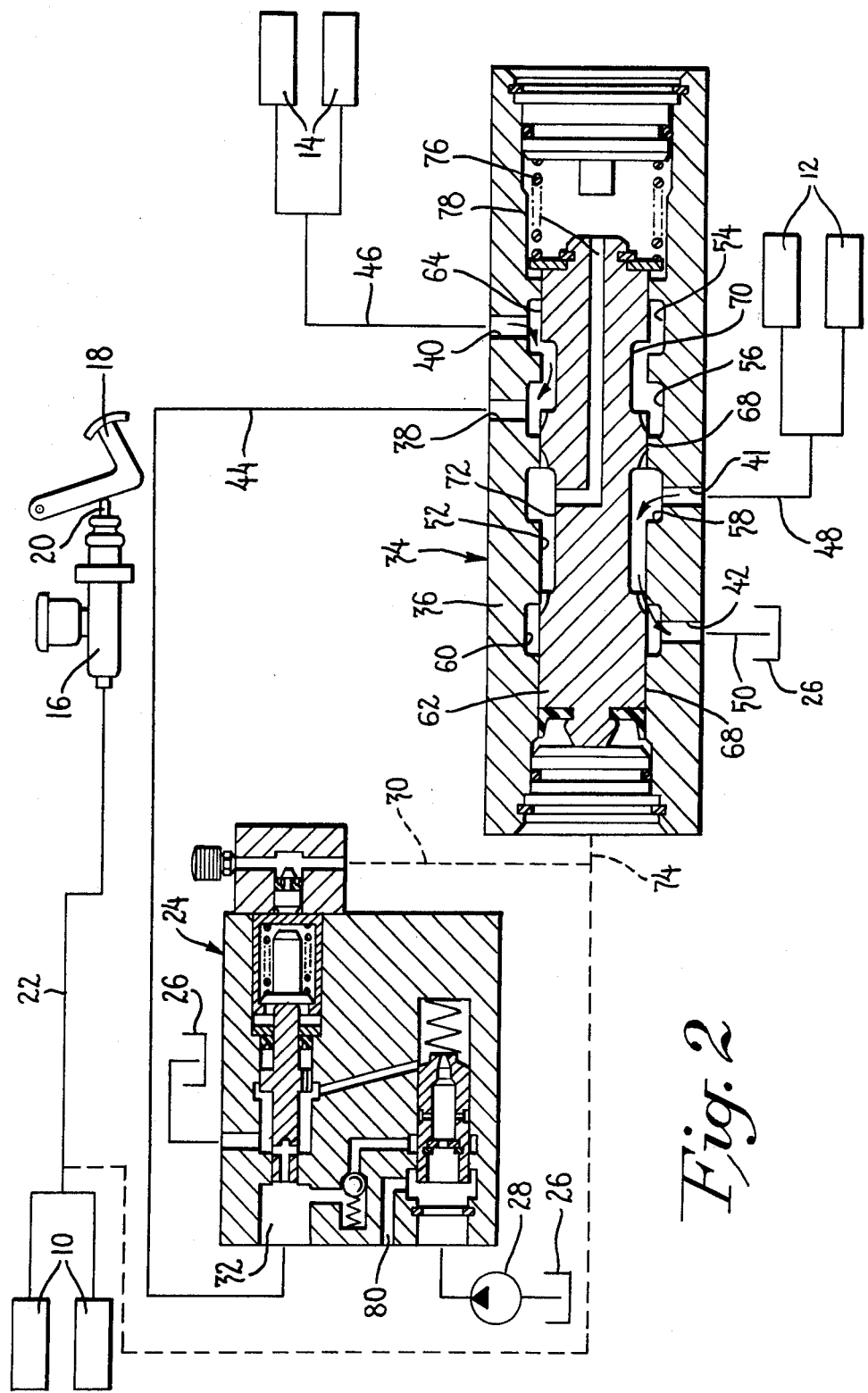
FIG. 2 is a view somewhat similar to FIG. 1, but illustrates the pilot operated trailer brake valve and the pilot operated control valve of this invention in section, the pilot operated control valve being in its normal first position.

FIGS. 1 and 2 illustrate a preferred embodiment wherein this invention is applied to a towing vehicle provided with a pair of front brakes 10 and a pair of rear brakes 12 and a trailer having brakes 14. The towing vehicle is provided with a brake master cylinder 16 operable by a vehicle operator through a foot brake pedal 18 interconnected with the plunger 20 of the brake master cylinder. When the operator of the vehicle steps upon the brake pedal 18 the brake master cylinder is capable of delivering pressurized fluid within a first pressure range, this fluid being delivered in the system illustrated through a first fluid line 22 which extends between the brake master cylinder and the front vehicle brakes.

Figure 3:
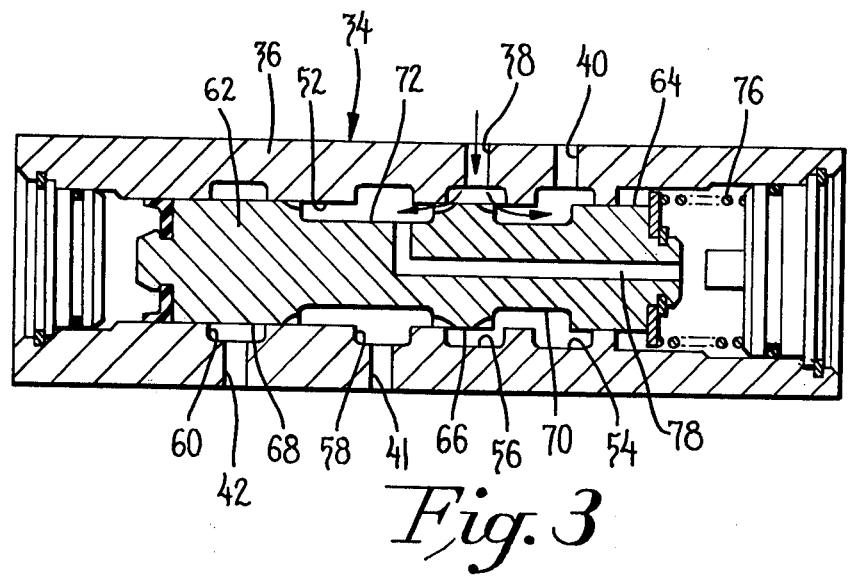
FIG. 3 illustrates the pilot operated control valve of this invention in its second position.

The towing vehicle is also provided with a trailer brake valve indicated generally at 24. As this trailer brake valve is of the type illustrated in FIG. 3 of U.S. Pat. No. 3,718,373, it will not be described in detail. The towing vehicle is additionally provided with a fluid reservoir 26 and a pump 28 which acts as a source of fluid under pressure for the trailer brake valve 24. A pilot line 30 extends between the first fluid line 22 and the trailer brake valve. The trailer brake valve will deliver fluid under pressure to an outlet port 32 at a pressure range greater than the pressure range exerted by the brake master cylinder. Thus, in the preferred embodiment, the output pressure range of the trailer brake valve is seven times greater than the output pressure range of the brake master cylinder. In any event, the output pressure range of the trailer brake valve is so selected that it will properly operate the trailer brakes. Thus, a hydraulic line in the prior art would normally extend from the output port 32 to the trailer brakes.

According to the principles of this invention a novel pilot operated control means is added to the components set forth above to provide a novel braking system. The control means includes a pilot operated control valve indicated generally at 34. The valve 34 includes a valve body 36 (FIG. 2) provided with an inlet port 38 and first, second and third outlet ports 40, 41, and 42. A second fluid line 44 interconnects the inlet port 38 with the outlet port 32 of the trailer brake valve 24. A third line or trailer brake line 46 extends from the first outlet port 40 of the control valve 34 to the trailer brakes 14. A fourth or vehicle brake line 48 extends from the second outlet port 41 of the control valve 34 to the rear vehicle brakes 12. Another line 50 extends between the third outlet port 42 and the reservoir 26.

The valve body 36 is provided with a cylindrical bore 52, the bore being provided with four axially spaced apart recesses 54, 56, 58, 60 which are associated with the first outlet port 40, the inlet port 38, and the second and third outlet ports 41, 42, respectively. As can be seen from FIG. 2, the inlet recess 56 is disposed between the first and second outlet recesses 54, 58, and the second outlet recess 58 is disposed between the inlet recess 56 and the third outlet recess 60. A valve member in the form of a spool 62 is disposed within the cylindrical bore, the spool being provided with three axially spaced apart lands 64, 66, and 68. Reliefs 70 and 72 are located between adjacent lands. A second pilot line 74, which is connected at one end to the output of the master cylinder, extends to one end of the cylindrical bore 52. The other end of the cylindrical bore is closed and a spring 76 is disposed within the closed end, the spring normally biasing the spool to a normal operating position illustrated in FIG. 2. The spool is further provided with a passageway 78 which extends between the relief 72 and the end of the spool adjacent the spring 76.

The operation of the system described above is as follows: When the system is in its normal condition, that is to say when the brakes are not being applied, the various components will be in the position illustrated in FIGS. 1 and 2. At this time the pressure in the various lines 22, 30, 42, 46, 48 and 74 can be considered to be nominal. The output of the pump 28 will be delivered to an outlet port 80 in the trailer brake valve, which output may be used to power various hydraulic components on the vehicle and then be returned to the reservoir 26.

When the vehicle operator applies the brakes by stepping upon foot pedal 18 pressure will build up in the line 22 and also in pilot lines 30 and 74 within a first pressure range. Pilot line pressure in line 30 will in turn cause a portion of the output of pump 28 to be diverted by the trailer brake valve to the outlet port 32 in the preselected pressure range. Pilot line pressure in pilot line 74 will also cause the valve spool 62 to shift from the position illustrated in FIG. 2 to the position illustrated in FIG. 3. This is a balanced spool position. When the spool 62 is in this position there will be an unrestricted passageway between the inlet port 38 and the outlet port 40. This causes the pressure in the trailer brake line 46 to be substantially the same as in the inlet line 44. However, there will be a restricted passageway between the inlet port 38 and the outlet port 41 causing a pressure drop until the pressure in line 48 is approximately the same as the pressure in pilot line 74. This is attained by having the pressure in the spring end of the bore balance the pilot line pressure 74 through the use of the passageway 78.

Figure 4:
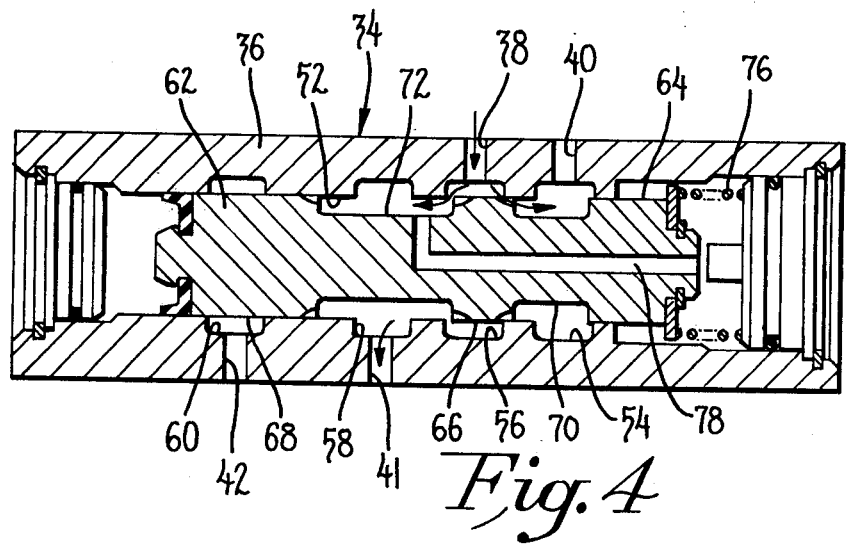
FIG. 4 illustrates the pilot operated control valve of this invention in its third position.

In the event that the trailer line 46 should break during braking operation, the valve spool will be shifted to a third position illustrated in FIG. 4. In this position the land 66 cooperating with the recess 56 will restrict the flow of fluid from line 44 to the trailer brake line 46. In the meantime the flow of fluid from the line 44 to the tractor rear brake line 48 will not be restricted. However, the fluid pressure within the recess 58 will be maintained equal to the pilot line pressure as the spool will be maintained in a balanced position due to passageway 78.

While the present invention has been described in connection with a preferred embodiment in which a master cylinder is utilized to apply the tractor front brakes and the pilot operated control valve is utilized to direct fluid from a trailer brake valve to both trailer brakes and the rear brakes, this invention can be utilized in other applications. For example, the pilot operated control valve can be utilized to direct fluid not only to the trailer brakes, but to all of the brakes of the vehicle. Other applications of this invention should be apparent to those skilled in the art.

While a preferred structure in which the principles of the present invention have been incorporated is shown and described above, it is to be understood this this invention is not to be limited to the particular details shown and described above, but that, in fact, widely different means may be employed in broader aspects of this invention.

What is claimed is:

1. A hydraulic braking system for a vehicle having brakes and a trailer having brakes, the trailer brakes being hydraulically operated at a pressure range proportionately greater than the pressure range required for operating the vehicle brakes; said system comprising:

a brake master cylinder which, when operated, is capable of delivering pressurized fluid within a first pressure range;

a source of fluid under pressure:

a pilot operated trailer brake valve interconnected with the source of fluid under pressure and which, when operated, is capable of delivering fluid to an outlet port within a second pressure range greater than the first pressure range; and pilot operated control means interconnecting said outlet port with the vehicle brakes and the trailer brakes and which, when operated, is capable of causing the rear vehicle brakes to be hydraulically operated within said first pressure range and the trailer brakes to be hydraulically operated within said second pressure range.

2. The hydraulic braking system for a vehicle set forth in claim 1 in which the pilot operated control means includes a pilot operated control valve having an inlet port interconnected to the source of fluid under pressure, a first outlet port, and a second outlet port; said control means further including a trailer brake line extending between the first outlet port and the trailer brakes, and a vehicle brake line extending between the second outlet port and the vehicle brakes.

3. The hydraulic braking system for a vehicle set forth in claim 2 in which the pilot operated control valve includes: a valve body provided with said inlet port and said first and second outlet ports, and a valve member for controlling the flow of fluid between said inlet and said outlets, said valve member normally being spring biased to a first position, said valve member being shifted in response to pilot pressure to a second position when said pilot and said first outlet are pressurized to connect the first and second outlets with the inlet, the second outlet being connected with the inlet through a restricted passageway whereby the pressure in the second outlet to the vehicle brakes is reduced with respect to the inlet pressure.

4. The hydraulic braking system for a vehicle set forth in claim 1 in which the pilot operated control means includes a pilot operated control valve, a vehicle brake line to the vehicle brakes, and a trailer brake line to the trailer brakes, said pilot operated control means being additionally capable of causing the rear vehicle brakes to be hydraulically operated within said first pressure range in the event of a break in the trailer brake line.

5. The hydraulic braking system for a vehicle set forth in claim 4 in which the pilot operated control valve includes a valve body having an inlet interconnected with the source of fluid under pressure, a first outlet port interconnected with the trailer brake line and a second outlet port interconnected with the vehicle brake line, and a valve member for controlling the flow of fluid between said inlet and said outlet, said valve member normally being spring biased to a first position, said valve member being shifted in response to pilot pressure to a second position when said pilot and said first outlet are pressurized to connect the first and second outlet with the inlet, the second outlet being connected with the inlet through a restricted passageway whereby the pressure in the second outlet to the vehicle brakes is reduced with respect to the inlet pressure and in which the valve member is shifted in response to pilot pressure to a third position when the pilot is pressurized and the first outlet is open to atmosphere to connect the first outlet with the inlet through a restricted passageway whereby the desired reduced pressure in the second outlet to the vehicle brakes is maintained.

6. In a hydraulic braking system for a vehicle having front and rear brakes and a trailer having brakes, the trailer brakes being hydraulically operated at a pressure range proportionately greater than the pressure range required for operating the front and rear vehicle brakes; said system including:
a brake master cylinder which, when operated, is capable of delivering pressurized fluid to the front brakes of the vehicle within a first pressure range;
a source of fluid under pressure; and
a pilot operated trailer brake valve interconnected with a source of fluid under pressure and which, when operated, is capable of delivering fluid to an outlet port within a second pressure range greater than the first pressure range; the improvement comprising
pilot operated control means interconnecting the outlet port with the rear vehicle brakes and the trailer brakes and which, when operated, is capable of causing the rear vehicle brakes to be hydraulically operated within said first pressure range and the trailer brakes to be hydraulically operated within the second pressure range.

7. In a hydraulic brake system for a trailer having brakes and a towing vehicle having brakes, said system being of the type including a brake master cylinder which, when actuated, has an output pressure within a first pressure range; a source of fluid under pressure; a first pilot line interconnected with the brake master cylinder; a pilot operated trailer brake valve connected to the pilot line and the source of fluid under pressure and which, when operated by the first pilot line, is capable of delivering fluid to an outlet port within a second pressure range greater than the first pressure range; and a hydraulic line extending from the outlet port to the trailer brakes; the improvement comprising: a pilot operated control valve interposed in said hydraulic line and having an inlet and first outlet connected to the hydraulic line, and a second outlet; a second pilot line interconnected with the brake master cylinder and extending to the pilot operated control valve; and a vehicle brake line extending from the pilot operated control valve to the brakes of the vehicle; said pilot operated control valve during normal braking operation of the system being capable of causing fluid within said vehicle brake line to be pressurized within said first pressure range while the fluid within the hydraulic line is pressurized within said second pressure range.

8. The hydraulic brake system set forth in claim 7 in which the pilot operated control valve is further capable of causing fluid within said vehicle brake line to be pressurized within said first pressure range when the hydraulic line between the trailer brakes and the pilot operated control valve is open to atmosphere.

9. The hydraulic brake system set forth in claim 7 in which the pilot operated control valve includes a spool normally spring biased to a first position within a valve body, said valve spool being shiftable by pilot line pressure during braking to the second position if the hydraulic line to the trailer brakes from the pilot operated control valve is intact, and to a further third position if the line to the trailer brakes from the pilot operated control valve is open to atmosphere.

10. A hydraulic braking system for a vehicle having front and rear brakes and a trailer having brakes, the trailer brakes being hydraulically operated at a pressure range proportionately greater than the pressure range required for actuating the front and rear vehicle brakes; said system comprising:
a brake master cylinder which, when operated, is capable of delivering pressurized fluid within a first pressure range;
a first fluid line extending from the brake master cylinder to the front brakes of the vehicle;
a source of fluid under pressure;
a pilot operated trailer brake valve interconnected with a source of fluid under pressure and which, when operated, is capable of delivering fluid to an outlet port within a second pressure range proportionately greater than the first pressure range;

a pilot operated control valve;

a second fluid line extending from the outlet port of the pilot operated trailer brake valve to the pilot operated control valve;

third and fourth fluid lines extending from the pilot operated control valve to the trailer brakes and the rear brakes of the vehicle, respectively; and pilot lines extending from the first fluid line to the pilot operated trailer brake valve and the pilot operated control valve;

said pilot operated control valve during normal braking operation being capable of causing the fluid within the fourth fluid line to be pressurized within the first pressure range, and the fluid within the third fluid line to be pressurized within the second pressure range whereby the trailer brakes may be hydraulically operated at a pressure range proportionately greater than the pressure range required for actuating the front and rear vehicle brakes.

11. The hydraulic braking system for a vehicle as set forth in claim 10 in which said pilot operated control valve is capable of causing the fluid within the fourth fluid line to be pressurized within the first pressure range when the fluid within the third fluid line is open to atmosphere whereby the rear vehicle brakes may be operated when the third fluid line is broken.

12. A pilot line operated valve assembly for use in a braking system of the type described comprising:

a valve body having an inlet for pressurized fluid, a first outlet for admission of pressurized fluid to the brake system of a trailer, a second outlet for admission of pressurized fluid to the brakes of a towing vehicle, and a third outlet for evacuation of fluid; and a valve member for controlling the flow of fluid between said inlet and said outlets, said valve member normally being spring biased to a first position to cause the inlet to be connected with the first outlet and the second outlet to be connected with the third outlet, said valve member being shifted in response to pilot line pressure to a second position when said pilot line and said first outlet are pressurized to cause the first and second outlets to be connected with the inlet, the second outlet being connected with the inlet through a restricted passageway whereby the pressure in the second outlet to the vehicle brakes is reduced with respect to inlet pressure.

13. The pilot line operated valve assembly as set forth in claim 12 in which said spring is disposed within a closed chamber, and in which the valve member is provided with a passageway capable of maintaining fluid communication between said closed chamber and the second outlet, whereby the pressure within the pilot line, the closed chamber, and the second outlet are balanced.

14. The pilot line operated valve assembly as set forth in claim 12 in which the valve member may be shifted in response to pilot line pressure to the third position when the pilot line is pressurized and the first outlet is open to atmosphere to connect the first outlet with the inlet through a restricted passageway whereby the desired reduced pressure in the second outlet to the vehicle brakes is maintained.

15. The pilot line operated valve assembly as set forth in claim 14 in which the valve body is provided with a cylindrical bore closed at one end, said bore being provided with four axially spaced apart recesses associated with the inlet and the outlets, the inlet recess being disposed between the first and second outlet recesses, and the second outlet being disposed between the inlet recess and the third outlet recess; in which the valve member is a spool provided with three axially spaced apart lands, there being reliefs located between adjacent lands; said spool being provided with a passageway extending between the spring end and the relief disposed furthest away from said spring end; and in which said spring is disposed within said bore extending between the closed end of the bore and said spool; the valve spool and valve body being so dimensioned and constructed that when the spool is in the first position flow from the inlet to the second outlet recess is blocked by the intermediate land while permitting fluid flow between the inlet recess and the first outlet recess and also permitting fluid flow from the second outlet recess to the third outlet recess, that when the spool is in the second position flow from the inlet recess to the second outlet recess is blocked while permitting fluid flow between the inlet recess and the first outlet recess and also blocking fluid flow from the second outlet recess to the third outlet recess, and that when the spool is in the third position flow from the inlet recess to the first outlet recess is restricted while fluid flow between the inlet recess and the second outlet recess is permitted and also wherein flow from the second outlet recess to the third outlet recess is blocked.

16. In a hydraulic braking system for a vehicle having brakes and a trailer having brakes; said system including:

a brake master cylinder which is capable of delivering fluid under pressure;

a pump; and a pilot operated trailer brake valve interconnected with said pump and which, when operated, is capable of delivering fluid under pressure to an outlet port; the improvement comprising pilot operated control means interconnecting said outlet port with the vehicle brakes and the trailer brakes and which, when operated without loss of fluid to the trailer brake, is capable of causing the vehicle brakes and the trailer brakes to be hydraulically operated, and which, when operated with a loss of pressure to the trailer brakes, is capable of causing the vehicle brakes to be hydraulically operated.

17. The hydraulic braking system set forth in claim 16 in which the pilot operated control means includes a valve body having an inlet interconnected with the pump, a first outlet port interconnected with the trailer brakes, a second outlet port interconnected with the vehicle brakes, and a valve member for controlling the flow of fluid between said inlet and said outlets, said valve member normally being spring biased to a first position, said valve member being shifted in response to pilot pressure to a second position when said pilot and said first outlet are pressurized to connect the first and second outlets with the inlet in such a manner that the fluid pressure to the vehicle brake is maintained within a desired operating range, said valve member being shifted in response to pilot line pressure to a third position when the pilot is pressurized and the first outlet is open to atmosphere to connect the inlet with the second outlet in such a manner that the desires pressure range is maintained.

* * * * *